US009410524B2

(12) United States Patent
Schweiger et al.

(10) Patent No.: US 9,410,524 B2
(45) Date of Patent: Aug. 9, 2016

(54) METHOD AND DEVICE FOR AUTOMATICALLY SHUTTING OFF AN INTERNAL COMBUSTION ENGINE

(71) Applicant: Bayerische Motoren Werke Aktiengesellschaft, Munich (DE)

(72) Inventors: Benno Schweiger, Munich (DE); Isabella Eckel, Olching (DE); Lorenz Makeschin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/708,670

(22) Filed: May 11, 2015

(65) Prior Publication Data

US 2015/0322911 A1 Nov. 12, 2015

(30) Foreign Application Priority Data

May 12, 2014 (DE) .......................... 10 2014 208 919

(51) Int. Cl.
*F02N 11/08* (2006.01)
*G06F 19/00* (2011.01)
*G06G 7/70* (2006.01)

(52) U.S. Cl.
CPC ........ *F02N 11/0837* (2013.01); *F02N 11/0818* (2013.01); *F02N 2200/0801* (2013.01); *F02N 2200/12* (2013.01)

(58) Field of Classification Search
CPC . Y02T 10/48; F02N 11/0814; F02N 11/0818; F02N 11/0822; F02N 11/0837

USPC ....................................... 123/179.4; 701/112
See application file for complete search history.

(56) References Cited

U.S. PATENT DOCUMENTS

| 8,244,448 | B2* | 8/2012 | Newman | ............. | F02N 11/0807 |
| | | | | | 123/179.2 |
| 2014/0149022 | A1* | 5/2014 | Geissenhoener | ........ | B44D 3/18 |
| | | | | | 701/112 |
| 2014/0343830 | A1* | 11/2014 | Elwart | .................... | F02D 41/24 |
| | | | | | 701/112 |

FOREIGN PATENT DOCUMENTS

| DE | 100 23 331 A1 | 6/2001 |
| DE | 10 2011 004 046 A1 | 9/2011 |
| DE | 10 2011 107 005 A1 | 1/2013 |
| EP | 0 158 605 A1 | 10/1985 |

OTHER PUBLICATIONS

German Search Report dated Dec. 11, 2014, with English translation (Twelve (12) pages).

* cited by examiner

*Primary Examiner* — Sizo Vilakazi
(74) *Attorney, Agent, or Firm* — Crowell & Moring LLP

(57) ABSTRACT

A method is provided for automatically shutting off an internal combustion engine in a motor vehicle by way of a start-stop device, which automatically shuts off the internal combustion engine as soon as the predefined operating conditions are met. An automatic shut-off of the internal combustion engine is prevented when an actuation of a garage door opener for the electric displacement of the garage door is detected. A correspondingly designed start-stop device is provided for automatically shutting off the internal combustion engine, wherein a control unit is designed such that signals of the garage door opener and/or of a detection unit, which detects an electric opening of the garage door, can be received and the automatic shut-off of the internal combustion engine is permitted or prevented depending on the signals.

12 Claims, 2 Drawing Sheets

METHOD AND DEVICE FOR AUTOMATICALLY SHUTTING OFF AN INTERNAL COMBUSTION ENGINE

CROSS REFERENCE TO RELATED APPLICATION

This application claims priority under 35 U.S.C. §119 from German Patent Application No. 10 2014 208 919.0, filed May 12, 2014, the entire disclosure of which is herein expressly incorporated by reference.

BACKGROUND AND SUMMARY OF THE INVENTION

The invention relates to a method for automatically shutting off an internal combustion engine in a motor vehicle by way of a start-stop device, which automatically shuts off the internal combustion engine as soon as predefined operating conditions are met, as well as to such a start-stop device having a control unit for receiving predefined reception signals, so as to check whether the predefined operating conditions of the vehicle for initiating the automatic shut-off of the internal combustion engine are met, and for emitting actuating signals to the internal combustion engine for automatically shutting off the internal combustion engine when all predefined operating conditions are met.

At present, internal combustion engines are usually shut off manually by the driver by way of an ignition key. One exception is a method that is described in DE 100 23 331 A1. Instead of the ignition key, here the brake pedal position or the brake pedal pressure is evaluated. The shut-off process of the internal combustion engine is initiated if the brake pedal is actuated more strongly in the previously actuated position thereof after the motor vehicle has come to a stop. The disadvantage of such methods is that the motor vehicle driver alone is responsible for shutting off the internal combustion engine. Analyses of today's driving behavior show that the internal combustion engine is rarely shut off independently, such as at traffic lights, despite increased environmental awareness and higher fuel prices.

So as to lower the fuel consumption and $CO_2$ emissions of motor vehicles, methods and devices have been developed for automatically shutting off an internal combustion engine. EP 0 158 605 B1, for example, discloses such a device, which causes a shut-off and/or re-start of the internal combustion engine depending on different conditions. One condition, for example, is that the vehicle speed must be below a threshold value for a certain time before the internal combustion engine is shut off automatically.

Since automatically shutting off the internal combustion engine generally only appears to be useful and desirable by the driver when a sufficient residence time is to be expected during a vehicle stoppage, which is to say when the internal combustion engine is shut off, it is the object of the invention to improve the method for automatically shutting off the internal combustion engine, as well as the corresponding device, in such a way that customer satisfaction is increased, taking fuel efficiency aspects into consideration.

This and other objects are achieved according to the invention by a method for automatically shutting off an internal combustion engine in a motor vehicle by way of a start-stop device, which automatically shuts off the internal combustion engine as soon as predefined operating conditions are met, wherein an automatic shut-off of the internal combustion engine is prevented when an actuation of a garage door opener for the electric displacement of the garage door is detected.

The objects are also achieved by a start-stop device for automatically shutting off an internal combustion engine in a motor vehicle, having a control unit for receiving predefined reception signals, so as to check whether the predefined operating conditions of the vehicle for initiating the automatic shut-off of the internal combustion engine are met, and for emitting actuating signals to the internal combustion engine for automatically shutting off the internal combustion engine when all predefined operating conditions are met. The control unit is designed such that signals of a garage door opener and/or of a detection unit that detects an electric opening of the garage door can be received, and an automatic shut-off of the internal combustion engine is permitted or prevented depending on the signals of the garage door opener and/or of the detection unit.

The invention is based on a method that is essentially known per se for automatically shutting off an internal combustion engine in a motor vehicle by way of a start-stop device, which automatically shuts off the internal combustion engine as soon as the specified operating conditions are met. The shut-off condition can be the following conditions, for example:

A vehicle stoppage is detected.

Neutral is engaged in the case of manual transmissions.

The engine has exceeded a predefined temperature threshold.

The charge state of the starter battery is greater than a predefined charge state limit.

The invention is based on the finding that, in principle, it is not known in advance how long a vehicle stoppage or a situation of this nature, which is essentially suitable for automatically shutting off the internal combustion engine (because all predefined shut-off conditions are met), will last. However, so as to enable a suitable approval strategy for initiating an automatic shut-off process at least in certain situations, it is useful to evaluate as many available data as possible, from which at least one order of magnitude can be derived for the residence time in the stationary position.

The invention is now further based on the knowledge that the residence time during the vehicle stoppage will generally only be very brief when the vehicle is located in a garage entrance or garage exit situation and the driver is only waiting during the vehicle stoppage for the garage door to open, so as to then enter the garage or exit the garage, and therefore an automatic shut-off of the internal combustion engine does not appear to be useful.

Based thereon, the method according to the invention is characterized in that an automatic shut-off of the internal combustion engine is prevented (despite the presence of all predefined operating conditions that essentially initiate a shut-off of the internal combustion engine) when a manual or automatic actuation of a garage door opener for the electric displacement, in particular for the electric opening, of the garage door is detected. The term garage door, however, shall be understood to mean herein any form of access prevention device that can be electrically displaced (such as garage door, entrance barrier and/or passage restrictions that can be lowered into the ground). The actuation of the garage door opener or an electric displacement of the garage door can be triggered manually—for example by a corresponding actuation of an operating element of the garage door opener—or automatically—for example by detecting an (authorized) vehicle approaching the garage door. An electric displacement, in particular an opening, of the garage door can likewise be detected in a variety of ways. For example, either the garage door opener can emit a corresponding signal upon triggering (manual or automatic) or upon opening of the garage door, or the opening can be detected by way of a camera-based sensor system, wherein the signal processing and/or signal evaluation unit then emits a corresponding signal.

When a manual or automatic triggering of the garage door opener is detected, the automatic shut-off of the internal combustion engine is advantageously prevented until a shut-off prevention termination condition occurs. In principle, a plurality of different conditions can be defined within the meaning of a shut-off prevention termination condition. The simplest way is to prevent the automatic shut-off of the internal combustion engine for the entire duration that the predefined operating conditions are present, which is to say that the shut-off is prevented for the duration of the entire situation during which an automatic shut-off would essentially be initiated if the garage door opener were not actuated.

However, advantageously other shut-off prevention termination conditions can also be defined. For example, the automatic shut-off of the internal combustion engine can be prevented for a predefined duration (such as 5 to 10 seconds) upon detection of an actuation or a triggering of a garage door opener for displacing, in particular for opening, the garage door. When the duration has elapsed and all (remaining) predefined operating conditions that initiate or allow an automatic shut-off of the internal combustion engine continue to be met, the internal combustion engine can still be automatically shut off at this time. This design covers a situation, for example, in which the driver became engaged in a conversation while waiting for the garage door to open and now remains in the stationary position longer, so that a shut-off of the internal combustion engine appears to be useful.

As an alternative or in addition, upon detection of an actuation or triggering of a garage door opener for displacing, in particular for opening, the garage door, the automatic shut-off of the internal combustion engine can also be prevented while the vehicle speed is lower than a predefined limit value. Either a speed threshold close to the stationary speed (such as a value between 0 and 5 km/h) or a speed threshold in the lower speed range (such as between 10 and 20 km/h) can be selected as the limit value.

Analogously to the method according to the invention, the invention also provides a start-stop device for automatically shutting off an internal combustion engine in a motor vehicle, including a control unit for receiving predefined reception signals, so as to check whether predefined operating conditions of the vehicle for initiating an automatic shut-off of the internal combustion engine are met, and for emitting actuating signals to the internal combustion engine for automatically shutting off the internal combustion engine when all predefined operating conditions are met, wherein the control unit is further designed in such a way that signals of a garage door opener and/or of a detection unit that detects an electric opening of the garage door can be received, and an automatic shut-off of the internal combustion engine is permitted or prevented depending on the signals of the garage door opener and/or of the detection unit. The detection unit can be either directly a garage door opener or a unit that detects a triggering of the garage door opener or an electric opening of the garage door. As was already described above, the triggering of the garage door opener or the opening of the garage door can also be detected by way of a camera-based sensor system, which transmits corresponding signals to the control unit.

The garage door opener and/or the detection unit can either be integrated in the vehicle and transmit the signals via a signal line to the control unit, or it may not be rigidly connected to the vehicle (such as a mobile garage door opener) and transmit the signals to the control unit via a wired or wireless signal connection.

The control unit is advantageously designed in such a way that the same does not allow an automatic shut-off of the internal combustion engine when an actuation of the garage door opener for the electric displacement, in particular for the opening of the garage door was detected. The control unit can suppress the automatic shut-off of the internal combustion engine for a predefined duration or while the vehicle speed is lower than a predefined limit value.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
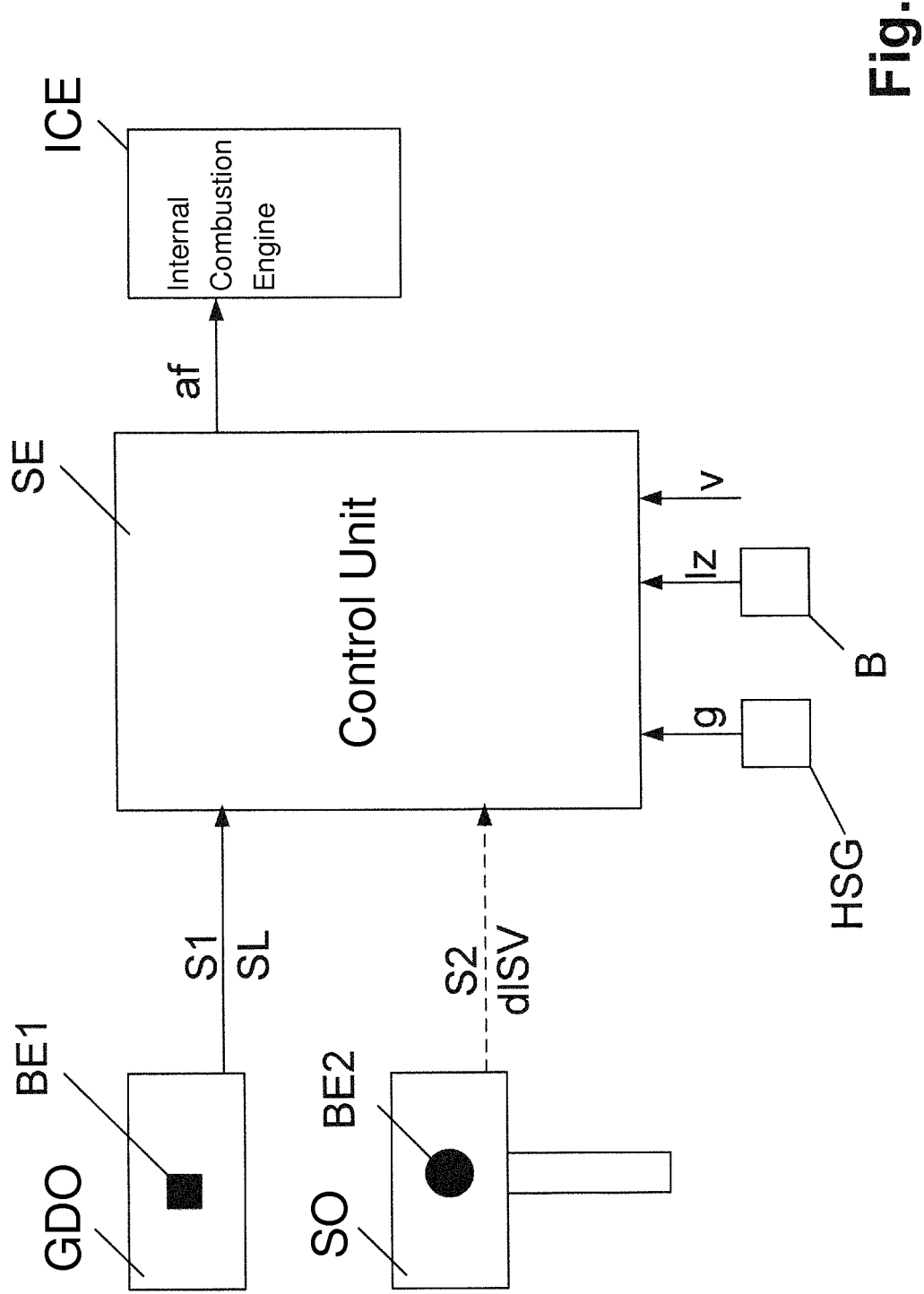
FIG. 1 is a simplified block diagram design of a start-stop device according to an embodiment of the invention.

FIG. 1 shows a control unit SE as the central element of the start-stop device, which is able to receive various input signals $s1$, $s2$, g, $1z$ and v and emit an output signal af.

In detail, the control unit SE is connected via a signal line SL to a programmable garage door opener GDO, which is integrated in the vehicle. The garage door opener GDO includes an operating element BE1, upon the actuation of which a first signal is emitted to a (programmable) electrically displaceable garage door for opening the garage door, and a further signal $s1$ is emitted to the control unit SE implemented in the vehicle, which coordinates the automatic shut-off of the internal combustion engine ICE. The control unit SE is furthermore connected via a non-wired communication and/or signal connection dISV (such as WLAN) to a barrier opening unit SO fixedly installed outside the vehicle in the region of an entrance barrier, wherein the barrier opening unit SO includes an operating element BE2, upon the actuation of which the barrier is opened and, at the same time, a corresponding signal $s2$ is emitted to the control unit SE via the wireless signal connection dISV. Finally, the control unit SE receives other input signals that are relevant for initiating an automatic shut-off process of the internal combustion engine ICE, such as a speed signal v, a charge state signal $1z$ of the starter battery B, and a signal about the presently engaged gear g of a manual transmission HSG.

Based on the available input signals $s1$, $s2$, g, $1z$ and v, the control unit SE determines whether or not an automatic shut-off of the internal combustion engine is to be carried out, and emits a signal af to the internal combustion engine ICE (or to the control unit thereof) for automatically shutting off the internal combustion engine ICE when all shut-off conditions are present and a shut-off prevention condition is not present.

Figure 2:
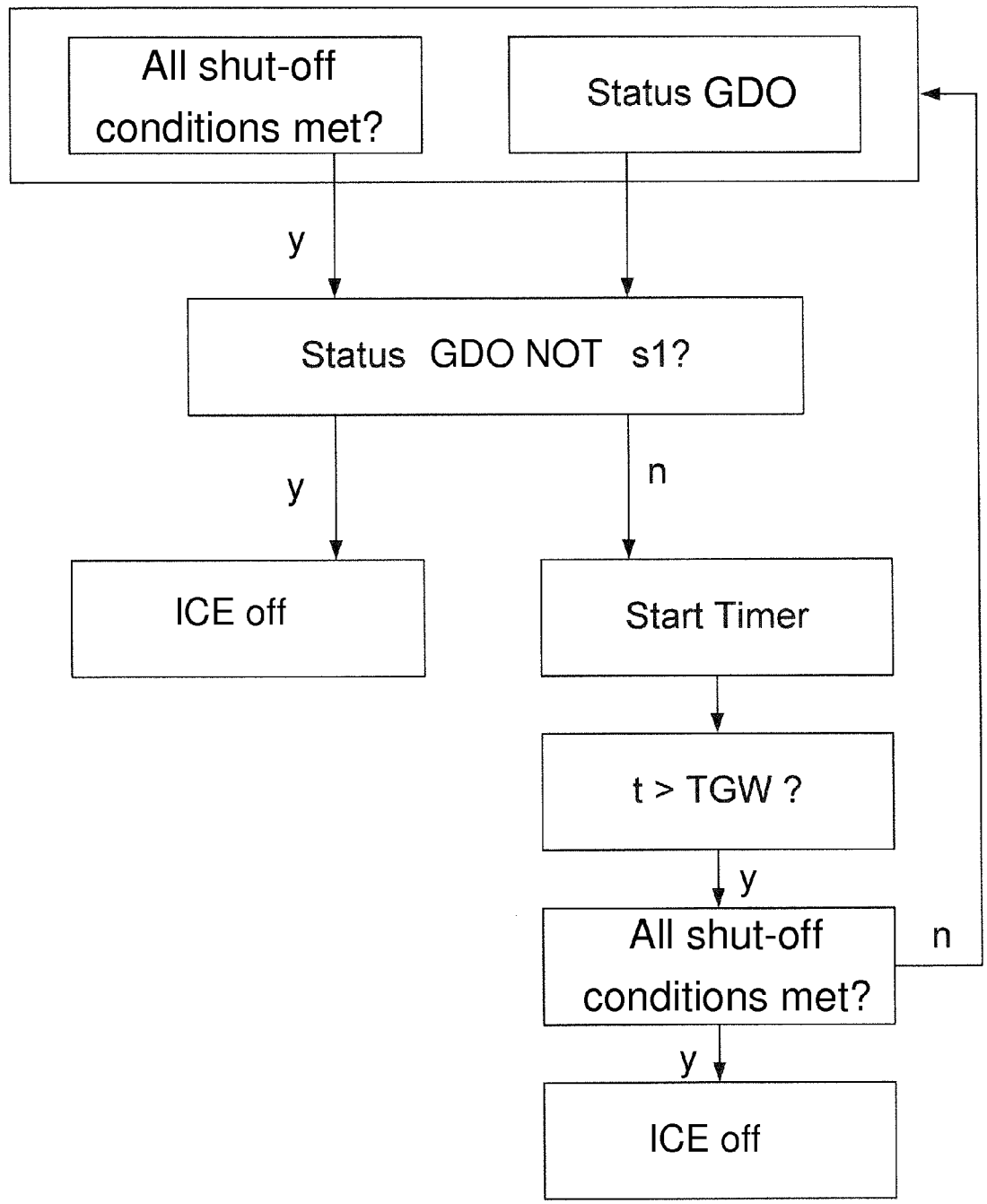
FIG. 2 is an exemplary flow chart of a method according to an embodiment of the invention for automatically shutting off an internal combustion engine.

Based on FIG. 2, a method for automatically shutting off the internal combustion engine will be described in greater detail, wherein at least some of the individual steps of the method can be implemented as a program in the control unit SE of the start-stop device.

Initially, it is checked whether all predefined shut-off conditions AB, which must be met for an automatic shut-off of the internal combustion engine, are met. At the same time, the status of the garage door opener GDO is continuously polled. The status can have two different embodiments:
1. The garage door is opened=$s1$
2. The garage door is not opened As soon as all predefined shut-off conditions AB are met, it is checked in the next step whether the status s1 transmitted by the garage door opener GDO is present, which is to say whether or not the garage door is presently being opened. If no signal s1 of the garage door opener is present (which is to say the garage door is not opened at the present time), the control unit initiates an automatic shut-off of the internal combustion engine.

However, if it is established that the garage door is presently being opened (which is to say signal s1 is present), a timer is started in the next step. Thereafter, the expiration of the timer is awaited in the next step. As soon as it is detected that the time t that has passed since the start of the timer is greater than a predefined duration TGW, it is checked again in the next step whether all shut-off conditions AB continue to be met. If the shut-off conditions AB continue to be met, an automatic shut-off of the internal combustion engine ICE is initiated. If the shut-off conditions AB are no longer met, the process is essentially ended and it is possible to return to the start of the process.

The invention described here can ensure in a simple and cost-effective manner that an automatic shut-off of the internal combustion engine is prevented while waiting for the garage door (or another access limitation device to be opened) to open. This reduces the wear and tear on the involved components, while also increasing the comfort of the driver, since he does not first have to wait for the engine to start after the garage door has opened.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for automatically shutting off an internal combustion engine in a motor vehicle by way of a start-stop device, the method comprising the acts of:
    determining whether predefined operating conditions are met, which predefined operating conditions normally correspond to an automatic shut-off of the internal combustion engine via the start-stop device; and
    preventing the automatic shut-off of the internal combustion engine due to the predefined operating conditions being met when an actuation of a garage door opener for electric displacement of a garage door is detected.

2. The method according to claim 1, wherein the garage door opener is actuated manually via actuation of an operating element.

3. The method according to claim 1, wherein the garage door opener is actuated automatically based on a detected presence of a predefined situation.

4. The method according to claim 1, further comprising the act of:
    preventing the automatic shut-off of the internal combustion engine only until a shut-off prevention termination condition occurs.

5. The method according to claim 1, further comprising the act of:
    preventing the automatic shut-off of the internal combustion engine only for a predefined duration.

6. The method according to claim 1, further comprising the act of:
    preventing the automatic shut-off of the internal combustion engine only while the vehicle speed is lower than a predefined limit value.

7. A start-stop device for automatically shutting-off an internal combustion engine in a motor vehicle, comprising:
    a control unit configured to receive predefined reception signals, so as to check whether predefined operating conditions of the motor vehicle for initiating an automatic shut-off of the internal combustion engine are met, and further configured to emit actuating signals to the internal combustion engine to automatically shut-off the internal combustion engine when all of the predefined operating conditions are met, wherein
    the control unit is further configured such that signals of a garage door opener and/or of a detection unit that detects an electric opening of a garage door are receivable, and the automatic shut-off of the internal combustion engine is permitted or prevented depending on the signals of the garage door opener and/or the detection unit.

8. The start-stop device according to claim 7, wherein the garage door opener and/or the detection unit are integrated into the motor vehicle and the signals are transmitted via a signal line to the control unit.

9. The start-stop device according to claim 7, wherein the garage door opener and/or the detection unit are not rigidly connected to the motor vehicle and the signals are transmitted via a wireless signal connection to the control unit.

10. The start-stop device according to claim 7, wherein the control unit is configured to not allow the automatic shut-off of the internal combustion engine when an actuation of the garage door opener for the electric opener of the garage door is detected.

11. The start-stop device according to claim 7, wherein the control unit is configured to not allow the automatic shut-off of the internal combustion engine for a predefined duration upon detecting the actuation of the garage door opener for the electric opening of the garage door.

12. The start-stop device according to claim 7, wherein the control unit is configured to not allow the automatic shut-off of the internal combustion engine upon detecting the actuation of the garage door opener while a vehicle speed is below a predefined limit value.

* * * * *